Figure 12:
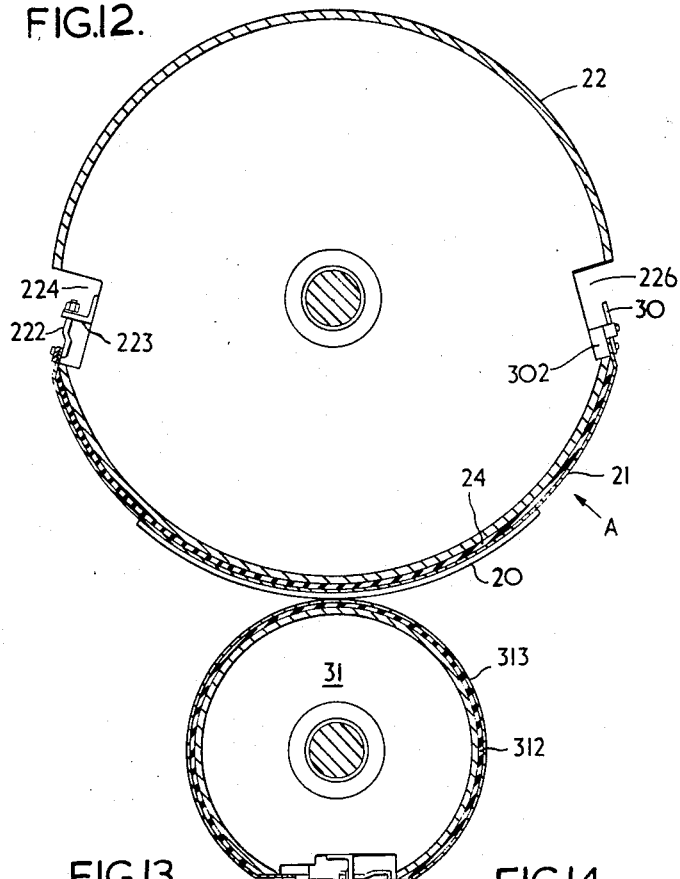

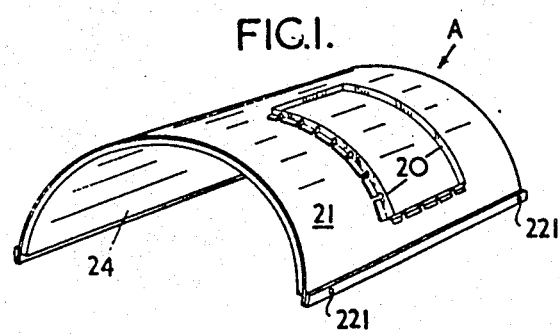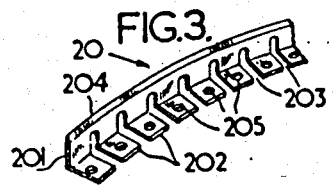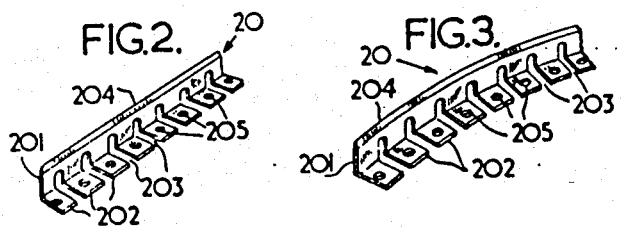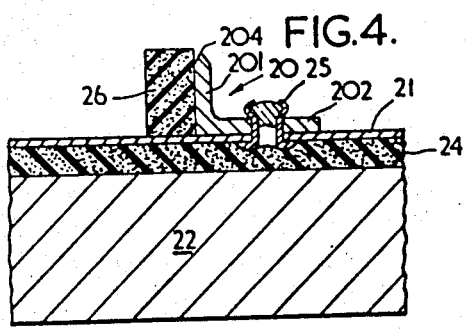

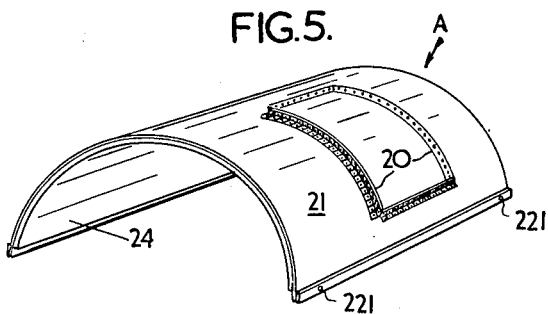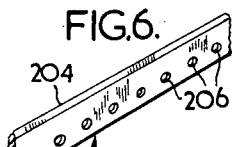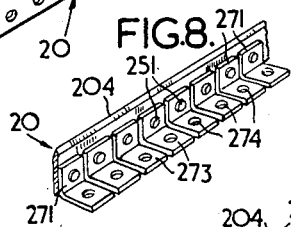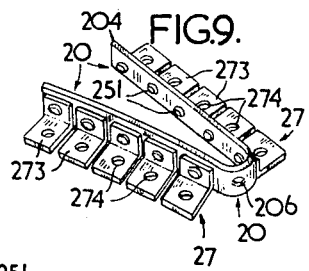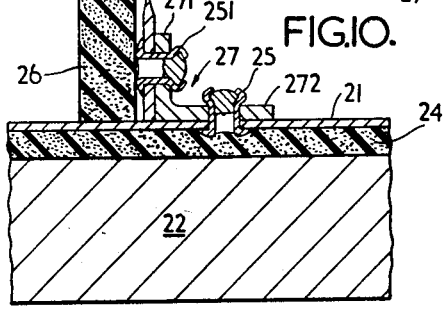

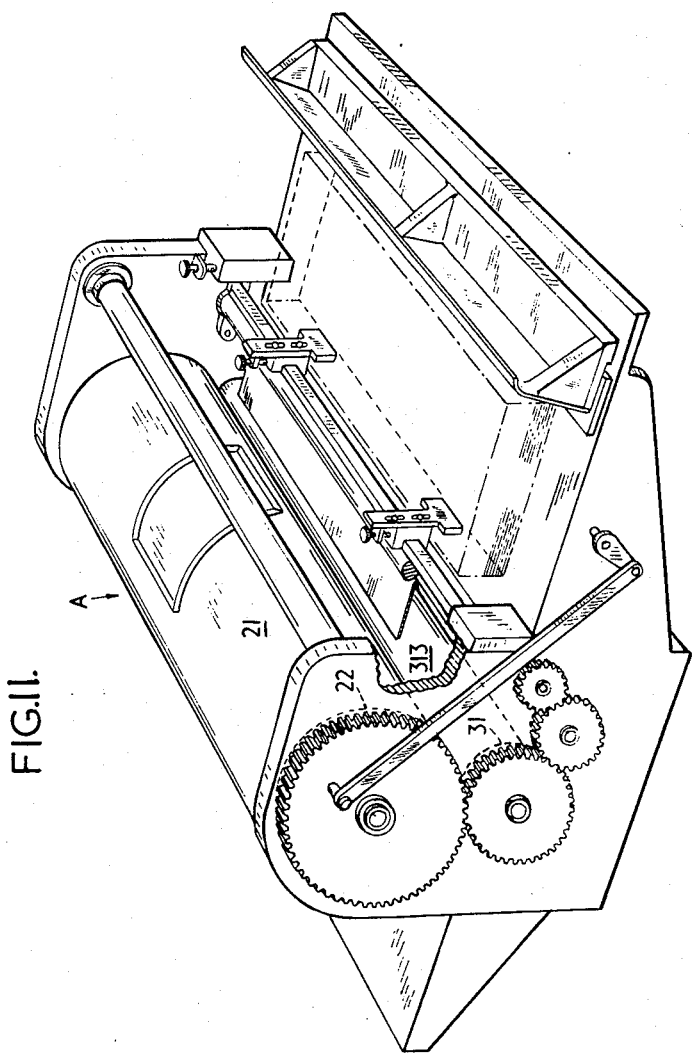

Aug. 3, 1965 K. KIRBY ETAL 3,198,093
APPARATUS FOR CREASING AND/OR CUTTING CARDBOARD AND
ANALOGOUS FLEXIBLE SHEET MATERIAL
Filed Jan. 22, 1964 4 Sheets-Sheet 4

United States Patent Office 3,198,093
Patented Aug. 3, 1965

3,198,093
APPARATUS FOR CREASING AND/OR CUTTING CARDBOARD AND ANALOGOUS FLEXIBLE SHEET MATERIAL
Kenneth Kirby, Keith Roland Tallett Kirby, and Colin Walter Kirby, all of Walsall, Stafford, England, assignors to Kirby's (Engineers) Limited, Walsall, Stafford County, England, a corporation of Great Britain and Northern Ireland
Filed Jan. 22, 1964, Ser. No. 339,549
Claims priority, application Great Britain, Jan. 28, 1963, 3,387/63; May 11, 1963, 18,746/63
5 Claims. (Cl. 93—58.2)

This invention has reference to apparatus for creasing and/or cutting cardboard and analogous flexible sheet material and is concerned with apparatus for creasing and/or cutting cardboard and analogous flexible sheet material disclosed in the specification of our pending United States patent application Serial No. 324,564 filed November 18, 1963 which itself is a division of our co-pending application Serial No. 128,805 filed August 2, 1961.

In the specification of our said prior patent application Serial No. 128,805 there is disclosed a method of creasing and/or cutting cardboard and analogous flexible sheet material residing inter alia in fabricating a forme of arcuate section by shaping a sheet of sheet metal to an arcuate shape for flexible fitment concentrically on a roller adapted to be positively driven and in fixing to the periphery of the shape so fashioned along the contour of the desired lines of creasing and/or severance lengths of "rule" which have been bent to an angle section by spot welding the horizontal flanges of the lengths of rule to the periphery of the arcuate sheet metal shape.

The present invention has for its object to provide apparatus for creasing and/or cutting cardboard and analogous flexible sheet material according to the method disclosed in the specification of our said prior patent application Serial No. 128,805, which is an improvement in, or modification of, apparatus for the said purpose as disclosed in the specifications of our said prior patent applications Serial Nos. 128,805 and 324,564.

Accordingly the invention consists of apparatus for creasing and/or cutting cardboard and analogous flexible sheet material in which the forme incorporates a backing of sheet metal bent to an arcuate shape for flexible fitment concentrically on a positively driven forme carrying roller and lengths of "rule" which are arranged to lie on the backing along the desired lines of creasing and/or severance and which are secured to the backing either directly or indirectly by through-fastening means which pass through the backing and in which a mat of resilient material is provided for interposition between the backing and the forme carrying roller as and when the forme is fitted thereto.

The invention also consists of apparatus for creasing and/or cutting cardboard and analogous flexible sheet material in which the forme incorporates a backing of sheet metal bent to an arcuate shape for fitment concentrically on a positively driven forme carrying roller and lengths of "rule" which are bent to an angle section and which are arranged to lie on the backing along the desired lines of creasing and/or severance and in which the horizontal flanges of the lengths of rule so bent and arranged are secured to the backing by means of rivets or bolts passed through the horizontal flanges of the said lengths and through the backing and in which a mat of resilient material is provided for interposition between the backing and the forme carrying roller as and when the forme is fitted thereto.

The invention further consists of apparatus for creasing and/or cutting cardboard and analogous flexible sheet material in which the forme incorporates a backing of sheet metal bent to an arcuate shape for fitment concentrically on a positively driven forme carrying roller and lengths of "rule" which are arranged to lie on the backing along the desired lines of creasing and/or severance and in which lengths of rule are adapted to be fixed to the vertical limb or limbs of an angle bracket or angle brackets in facial contact therewith conveniently by rivets or by bolts and in which the said bracket or brackets in turn is or are adapted to be secured to the backing conveniently also by rivets or by bolts passed through the horizontal flange or flanges of the said angle bracket or brackets and through the backing and in which a mat of resilient material is provided for interposition between the backing and the forme carrying roller as and when the forme is fitted thereto, thereby causing the rule to operate with a resilient rolling action.

The invention also resides in apparatus for creasing and/or cutting cardboard and analogous flexible sheet material constructed and adapted for use substantially as will be described hereinafter.

The invention will now be described with particular reference to the accompanying drawings which illustrate the invention as applied to a forme based on a tympan or backing as it is herein termed in the form of a sheet of alloy steel conveniently of 16 S.W.G. or thereabouts which is flexible and may be bent to conform to the periphery of the forme carrying roller to which it is to be applied according to the method of and apparatus for creasing and/or cutting cardboard disclosed in the specifications of our said prior patent applications Serial Nos. 128,805 and 324,564.

In the drawings:

FIGURE 1 is a perspective view of a forme constructed according to one embodiment of the invention, FIGURE 2 is a fragmentary view in perspective of a straight section of rule for employment in the construction of a forme as illustrated in FIGURE 1, FIGURE 3 is a fragmentary view of a curved section of rule for employment in the construction of a forme as illustrated in FIGURE 1 where a curved section of rule is required, FIGURE 4 is a fragmentary view in section and on an enlarged scale illustrating a forme constructed as shown in FIGURE 1 fitted to the positively driven forme carrying roller of the apparatus described and illustrated in the specifications of our prior patent applications aforesaid, FIGURE 5 is a perspective view of a forme constructed in accordance with another embodiment of the invention, FIGURE 6 is a fragmentary view in perspective of a straight section of rule for use in the construction of a forme as illustrated in FIGURE 5, FIGURE 7 is a perspective view of one of the brackets employed in the construction of a forme as illustrated in FIGURE 5, FIGURE 8 is a fragmentary view in perspective of a straight section of rule fixed to brackets as illustrated in FIGURE 7, FIGURE 9 is a fragmentary view in perspective of a bent section of rule fixed to brackets as illustrated in FIGURE 7, FIGURE 10 is a fragmentary view in section and on an enlarged scale of a forme constructed as illustrated in FIGURES 5 to 9 fitted to the positively driven forme carrying roller of the apparatus described and illustrated in the specifications of our prior patent applications aforesaid.

FIGURE 11 is a perspective view of the apparatus which is described and illustrated in detail in the specifications of our said prior patent applications having fitted thereto a forme which may be constructed according to either of the embodiments disclosed in FIGURES 1 to 4 and 5 to 10, FIGURE 12 is a diagrammatic view on an enlarged scale of the forme carrying roller and impression roller incorporated in the machine illustrated in FIGURE 11 with a forme constructed as disclosed in either of the embodiments of the invention illustrated in FIGURES 1 to 4 or 5 to 10 fitted thereto and illustrating also the method of fixing a forme to the forme carrying roller as adopted in the specifications of our aforesaid prior patent applications.

Figure 13:
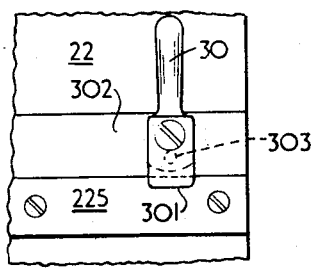
Figure 14:
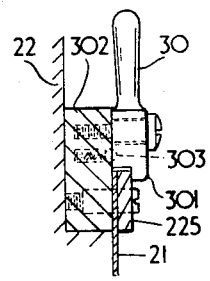

FIGURE 13 is a fragmentary view in front elevation on an enlarged scale illustrating the manner of securing one end of the forme to the forme carrying roller of the apparatus illustrated in FIGURE 11 as adopted in the specifications of our aforesaid prior patent applications and FIGURE 14 is a fragmentary view partly in side elevation and partly in section and also on an enlarged scale illustrating the manner of securing one end of the forme to the forme carrying roller according to the arrangement seen in FIGURE 13.

In the drawings, where appropriate, like numerals of reference are employed to indicate similar parts in the several views.

Referring first to the construction illustrated in FIGURES 1 to 4.

The lengths of steel rule denoted generically by the reference numeral 20 which are to be associated with the backing 21 are formed from a length of strip material conveniently of alloy steel and of 16 S.W.G. or thereabouts which is bent to an angle section with the vertical and horizontal flanges 201, 202 respectively slotted as at 203 below the cutting edge to facilitate the bending of the strips if required to lie along the desired lines of creasing and/or severance as may be required.

The horizontal flanges 202 of the lengths of steel rule 20 may be conveniently of ⅜" whilst the vertical flange 201 may be of a like height and provided with the customary pointed creasing and/or cutting edge 204.

The horizontal flanges 202 are provided with holes 205 for the passage of rivets as will be described hereinafter.

After bending the sheet metal backing 21 is superposed on a jig and the length or lengths of steel rule secured to the curved backing 21 by through-rivetting the horizontal flanges 202 of the lengths of rule to the backing 21 by passing the rivets through complementary holes in the backing 21 and through the holes 205 aforesaid after the lengths of rule 20 have been cut off to the required dimensions and located at the appropriate positions on the backing 21 along the lines of creasing and/or severance required.

Conveniently prior to fitting the forme to the solid forme carrying roller 22 as will be referred to hereinafter there is applied to the undersurface of the backing 21 a mat 24 of resilient material conveniently rubber of a thickness such that the rubber mat 24 takes up and encloses the head thicknesses of the rivets 25.

Conveniently there is fitted on the upper side of the backing 21 and adjacent the lengths of rule 20 fitted thereto strips of block rubber 26 for facilitating the separation of the creased and/or severed cardboard from the steel rule when creasing or severance has been effected, in a manner itself known.

According to the embodiment of the invention as illustrated in FIGURES 5 to 10 the lengths of steel rule 20 are secured to the vertical limbs 271 of a plurality of metal angle brackets 27 by rivets 251 passed through equidistantly spaced holes 206 in the lengths of rule 20 and registering holes 272 in the vertical flanges 271 with the lengths of steel rule 20 in facial contact with the vertical limbs 271 of their respective angle brackets 27.

With this embodiment of the invention after bending the sheet metal backing or tympan is superposed on a jig and the lengths of steel rule 20 secured to the said backing 21 along the appropriate lines of creasing or severance by through-rivetting the horizontal limbs 273 of the angle brackets 27 to the backing 21 by means of rivets 25 passed through holes in the backing 21 and through holes 274 in the horizontal flanges 273 of the brackets 27 after of course the lengths of rule 20 have been cut to the required dimensions and located at the appropriate position along the lines of creasing and/or severance.

Secured to the underside of the backing 21 conveniently by means of adhesive is a mat 24 of a resilient material again conveniently rubber of a thickness such that the rubber mat 24 take up the head-thicknesses of the rivets 25.

In this embodiment also conveniently there is provided on the upper surface of the backing 21 strips of block rubber 26 for a similar purpose to the disclosed in connection with the embodiment of the invention first described.

Further in the embodiment of the invention last described nuts and bolts may be substituted for the rivets 25, 251 and where it is possible in the production of a forme in accordance with this embodiment of the invention a length of rule 20 may be secured in facial contact with the vertical limb of a strip of angle section of an equivalent length instead of to a plurality of spaced angle brackets 27.

As the apparatus illustrated in FIGURES 11 to 14 is described and illustrated in the specifications of our prior patent applications Serial Nos. 128,805 and 324,564 aforesaid it is not necessary for the purposes of this invention to describe again in detail the apparatus disclosed in the said FIGURES 11 to 14 and it will suffice for the purposes of the present invention to state that in either of the embodiments described the complete forme designated by the reference letter A in FIGURES 1 and 5 may be rigidly attached to the forme carrying roller 22 by providing along one end of the forme A eyes 221, see FIGURES 1 and 5, and engaging the eyes 221 by hook bolts 222 which are carried by brackets 223 housed in a recess 224 in the forme carrying roller 22.

The other end of the forme A as is described and illustrated in our prior specifications aforesaid is attached to the forme carrying roller 22 by means of a clamping strip 225 fixed along the marginal edge of one end of the backing 21 in conjunction with the bosses 301 of a plurality of levers 30 one only of which is shown in the drawings each fulcrumed on a block 302, the levers 30 being retained when in the locking position by spring pressed balls 302 which engage within recesses in the bosses 301 in a manner well understood.

The levers 30 are housed in a recess 226 in the forme carrying roller 22 which is opposite to the recess 224 aforesaid.

It will be understood that by manipulation of the levers 30 a forme A may be locked to the forme carrying roller 22 or released therefrom as may be desired.

It will be appreciated that the mat 24 acts as a cushion beneath the forme A and prevents excessive damage to the rule 21 during creasing and/or cutting operations.

In order still further to prevent excessive damage to the lengths of rule a mat 312 of resilient material again conveniently rubber may be interposed also between the cutting plate 313 and the impression roller 31 which is required to cooperate with the forme carrying roller 22 as is seen in FIGURE 12.

It will be understood that the rubber mat 24 may be separated from the backing 21 and may be interposed between the backing 21 and the forme carrying roller 22 preparatory to the fitment of the forme A to the said forme carrying roller 22.

We claim:

1. Rotary apparatus for creasing and/or cutting cardboard and analogous flexible sheet material incorporating a solid rotatable forme-carrying roller, an impression roller, gearing interconnecting the forme-carrying roller and the impression roller whereby the said rollers may be driven positively simultaneously, a backing of relatively thin flexible sheet material bent to an arcuate shape for fitment concentrically on the said forme-carrying roller, lengths of rule arranged to lie on the backing along the desired lines of creasing and/or severance, through-fastening means which pass through the backing for securing the lengths of rule to the backing and which protrude on the underside of the backing, means for conforming and securing the backing to the forme-carrying roller and a mat of resilient material for interposition between the backing and the forme-carrying roller to cushion the backing and the rule thereon with respect to the forme-carrying roller and to enclose the aforesaid protuberances of the through-fastening means whereby the said mat not only cushions the lengths of rule from the shocks occasioned by creasing or cutting but also prevents additional shocks due to metal to metal contact of the said protuberances and the periphery of the forme-carrying roller, said mat also compensating for the lack of rigidity of the forme by reason of the forme being made of flexible relatively thin sheet metal.

2. Rotary apparatus for creasing and/or cutting cardboard and analogous flexible sheet material as claimed in claim 1, in which the lengths of rule are of an angle section and in which the lengths of rule are secured to the said flexible backing by through-fastening means which pass through the horizontal flanges of the said lengths and through the backing.

3. Rotary apparatus for creasing and/or cutting cardboard and analogous flexible sheet material as claimed in claim 1, in which the lengths of rule are fixed to the vertical limbs of angle brackets in facial contact therewith and in which the said brackets in turn are secured to the backing by through-fastening means which are passed through the horizontal flange of an angle bracket and through the said backing and are enclosed within the mat.

4. Rotary apparatus for creasing and/or cutting cardboard and analogous flexible sheet material as claimed in claim 1 in which the mat is attached to the underside of the backing.

5. Rotary apparatus for creasing and/or cutting cardboard and analogous flexible sheet material as claimed in claim 1 in which the mat is separated from the flexible backing and is interposed between the backing and the solid forme-carrying roller preparatory to the securing of the backing to the forme-carrying roller.

References Cited by the Examiner
UNITED STATES PATENTS

| | | | |
|---|---|---|---|
| 972,300 | 10/10 | Vavra | 93—58.2 |
| 2,589,022 | 3/52 | Page et al. | 93—58 X |
| 2,942,534 | 6/60 | Boddy | 93—58.2 |
| 3,119,312 | 1/64 | Henc | 93—58.2 |

FOREIGN PATENTS

| | | |
|---|---|---|
| 867,049 | 2/53 | Germany. |
| 877,866 | 9/61 | Great Britain. |

WHITMORE A. WILTZ, *Primary Examiner.*

BERNARD STICKNEY, FRANK E. BAILEY,
*Examiners.*